(12) United States Patent
Brown et al.

(10) Patent No.: US 6,196,689 B1
(45) Date of Patent: Mar. 6, 2001

(54) MIRROR SYSTEM FOR TRACTOR TRAILERS

(76) Inventors: Timothy Brown; Jaqueline Brown, both of 18204 Soledad Canyon Rd. #15, Canyon Country, CA (US) 91351

( * ) Notice: Subject to any disclaimer, the term of this patent is extended or adjusted under 35 U.S.C. 154(b) by 0 days.

(21) Appl. No.: 09/591,130

(22) Filed: Jun. 10, 2000

(51) Int. Cl.[7] .............................. G02B 5/08; G02B 7/182; B60R 1/04; B60R 1/10
(52) U.S. Cl. ...................... 359/857; 359/865; 359/872; 359/850; 359/855
(58) Field of Search .................... 359/850, 854, 359/855, 856, 857, 858, 859, 861, 862, 863, 865, 872

(56) References Cited

U.S. PATENT DOCUMENTS

| | | | |
|---|---|---|---|
| 1,426,010 | * 8/1922 | Rees | 359/855 |
| 1,533,937 | * 4/1925 | Mogor | 359/855 |
| 1,727,727 | * 9/1929 | Ostrander | 359/862 |
| 1,870,468 | * 8/1932 | Ross | 359/863 |
| 2,854,882 | * 10/1958 | Cooper | 359/862 |
| 3,394,978 | * 7/1968 | Muller | 359/861 |
| 4,345,819 | * 8/1982 | Villa-Real | 359/865 |
| 5,237,459 | * 8/1993 | Strauss | 359/863 |
| 5,479,297 | 12/1995 | Summers | 359/841 |
| 5,745,310 | 4/1998 | Mathieu | 359/843 |
| 5,760,978 | 6/1998 | Smith | 359/855 |
| 5,790,328 | * 8/1998 | Strauss et al. | 359/863 |
| 6,012,819 | * 1/2000 | Pai | 359/855 |

FOREIGN PATENT DOCUMENTS

0498720 * 11/1955 (IT) ..................... 359/862

* cited by examiner

*Primary Examiner*—Ricky D. Shafer
(74) *Attorney, Agent, or Firm*—Goldstein & Canino

(57) ABSTRACT

A mirror system for tractor trailers including a base secured within the cab of the truck intermediate the drivers side and the passengers side thereof. The base has a generally planar upper surface. A system of mirrors are secured to the upper surface of the base allowing a driver of the truck to see blind spots normally associated with trucks.

1 Claim, 2 Drawing Sheets

MIRROR SYSTEM FOR TRACTOR TRAILERS

BACKGROUND OF THE INVENTION

The present invention relates to a mirror system for tractor trailers and more particularly pertains to allowing a truck driver to visualize normal blind spots of their truck.

The use of mirror systems is known in the prior art. More specifically, mirror systems heretofore devised and utilized for the purpose of improving a driver's ability to see blind spots are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,479,297 to Sumnmers discloses a mirror assembly comprised of a fixed mirror and a movable mirror contained in a frame and capable of being controlled to eliminate a vehicle's blind spots while traveling in the forward or backward direction. U.S. Pat. No. 5,745,310 to Mathieu discloses a vehicle side mirror capable of allowing a driver to view an area in his blind spot. U.S. Pat. No. 5,760,978 to Smith discloses a dual rear view mirror system.

While these devices fulfill their respective, particular objective and requirements, the aforementioned patents do not describe a mirror system for tractor trailers for allowing a truck driver to visualize normal blind spots of their truck.

In this respect, the mirror system for tractor trailers according to the present invention substantially departs from the conventional concepts and designs of the prior art, and in doing so provides an apparatus primarily developed for the purpose of allowing a truck driver to visualize normal blind spots of their truck.

Therefore, it can be appreciated that there exists a continuing need for a new and improved mirror system for tractor trailers which can be used for allowing a truck driver to visualize normal blind spots of their truck. In this regard, the present invention substantially fulfills this need.

SUMMARY OF THE INVENTION

In the view of the foregoing disadvantages inherent in the known types of mirror systems now present in the prior art, the present invention provides an improved mirror system for tractor trailers. As such, the general purpose of the present invention, which will be described subsequently in greater detail, is to provide a new and improved mirror system for tractor trailers which has all the advantages of the prior art and none of the disadvantages.

To attain this, the present invention essentially comprises a base secured within the cab of the truck intermediate the drivers side and the passengers side thereof. The base has a generally planar under side surface. A drivers side mirror is secured to the lower surface of the base. The drivers side mirror is directed out the drivers side of the cab whereby a driver can see over his shoulder. A first passenger side pair of mirrors are secured to the lower surface of the base. The first passenger side pair of mirrors includes a downwardly directed mirror aimed towards a right front fender of the truck. The first passenger side pair of mirrors includes a reflecting mirror positioned for allowing the driver to see images reflected by the downwardly directed mirror. A second passenger side pair of mirrors are secured to the lower surface of the base. The second passenger side pair of mirrors includes a rearwardly directed mirror directed rearwardly of the passenger side door of the cab. The second passenger side pair of mirrors includes a reflecting mirror positioned for allowing the driver to see images reflected by the rearwardly directed mirror.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mirror system for tractor trailers which has all the advantages of the prior art mirror systems and none of the disadvantages.

It is another object of the present invention to provide a new and improved mirror system for tractor trailers which may be easily and efficiently manufactured and marketed.

It is a further object of the present invention to provide a new and improved mirror system for tractor trailers which is of durable and reliable construction.

An even further object of the present invention is to provide a new and improved mirror system for tractor trailers which is susceptible of a low cost of manufacture with regard to both materials and labor, and which accordingly is then susceptible of low prices of sale to the consuming public, thereby making such a mirror system for tractor trailers economically available to the buying public.

Even still another object of the present invention is to provide a new and improved mirror system for tractor trailers for allowing a truck driver to visualize normal blind spots of their truck.

Lastly, it is an object of the present invention to provide a new and improved mirror system for tractor trailers including a base secured within the cab of the truck intermediate the drivers side and the passengers side thereof. The base has a generally planar lower surface. A system of mirrors are secured to the upper surface of the base allowing a driver of the truck to see blind spots normally associated with trucks.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
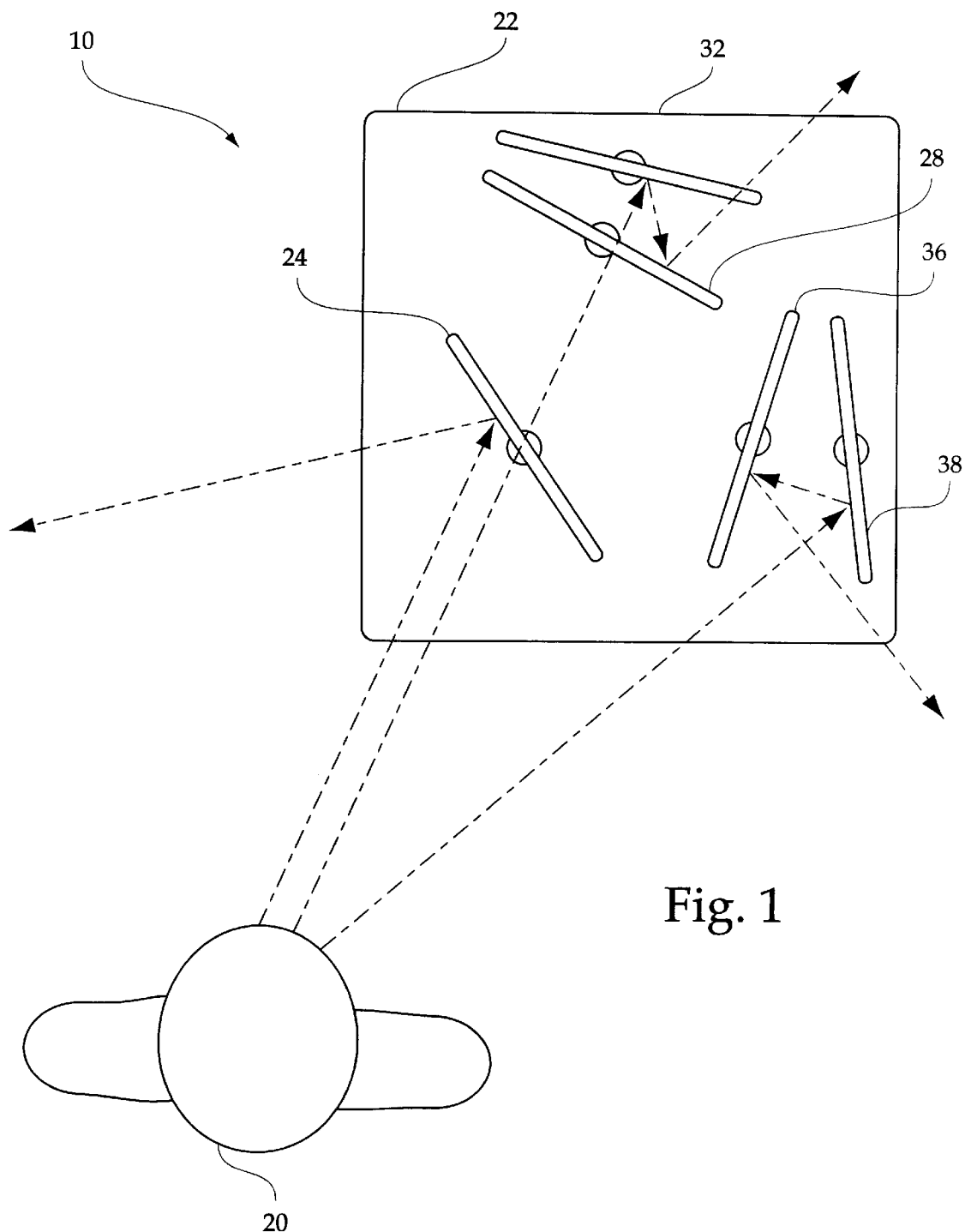
FIG. 1 is a plan view of the preferred embodiment of the mirror system for tractor trailers constructed in accordance with the principles of the present invention.
Figure 2:
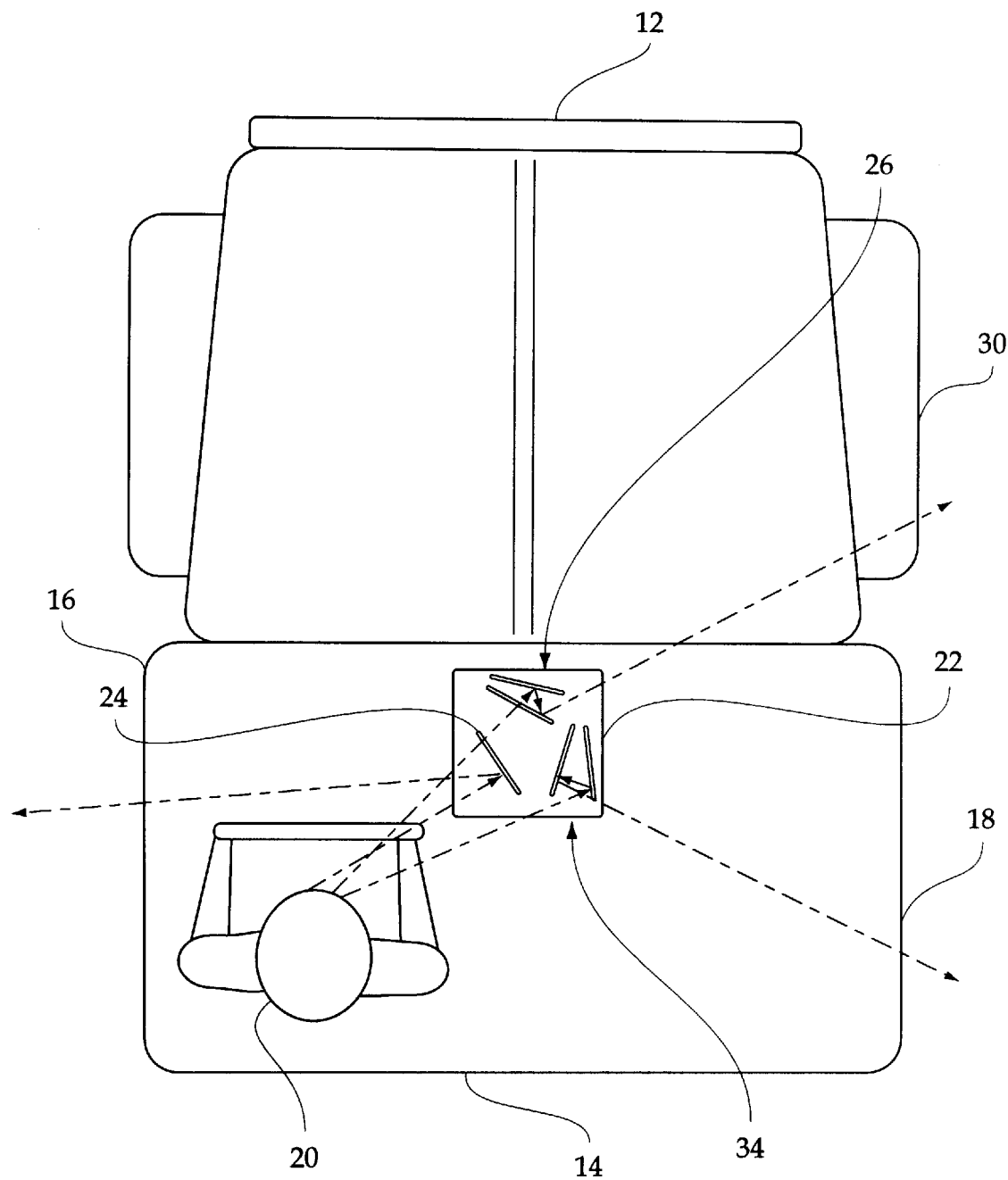
FIG. 2 is a plan view of the present invention illustrated within a cab of the truck.

With reference now to the drawings, and in particular, to FIGS. 1 and 2 thereof, the preferred embodiment of the new and improved mirror system for tractor trailers embodying the principles and concepts of the present invention and generally designated by the reference number 10 will be described.

Specifically, it will be noted in the various figures that the device relates to a mirror system for tractor trailers for allowing a truck driver to visualize normal blind spots of their truck. In its broadest context, the device consists of a base, a drivers side mirror, a first passenger side pair of mirrors and a second passenger side pair of mirrors. Such components are individually configured and correlated with respect to each other so as to attain the desired objective.

The present invention essentially is designed for a truck 12 that includes a cab 14 having a drivers side 16 and a passengers side 18. The truck 12 includes a driver's seat to accommodate a driver 20.

The base 22 is secured within the cab 14 of the truck 12 intermediate the drivers side 16 and the passengers side 18 thereof. The base 22 has a generally planar lower surface.

The drivers side mirror 24 is secured to the lower surface of the base 22. The drivers side mirror 24 is directed out the drivers side 16 of the cab 14 whereby the driver 20 can see over his shoulder. This mirror 24 allows the driver 20 to see the area that he must normally turn to look over his left shoulder in order to see.

The first passenger side pair of mirrors 26 are secured to the upper surface of the base 22. The first passenger side pair of mirrors 26 includes a downwardly directed mirror 28 aimed towards a right front fender 30 of the truck 12. The first passenger side pair of mirrors 26 includes a reflecting mirror 32 positioned for allowing the driver 20 to see images reflected by the downwardly directed mirror 28. These mirrors 26 allow the driver 20 to see the area in front of the passenger side front fender that is normally difficult to see without undue straining by the driver.

The second passenger side pair of mirrors 34 are secured to the lower surface of the base 22. The second passenger side pair of mirrors 34 includes a rearwardly directed mirror 36 directed rearwardly of the passenger side door of the cab 14. The second passenger side pair of mirrors 34 includes a reflecting mirror 38 positioned for allowing the driver 20 to see images reflected by the rearwardly directed mirror 36. These mirrors 34 allow the driver 20 to better see behind the passenger side door of the truck 12, particularly useful when traveling on multi-lane highways where cars often pass trucks on the passenger side and are difficult to see.

It is important to note that each of the abovementioned mirrors is adjustable to accommodate the particular needs of the driver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A mirror system for tractor trailers for allowing a truck driver to visualize normal blind spots of their truck, whereby the truck includes a cab having a drivers side and a passengers side, the truck including a driver's seat to accommodate a driver, the mirror system comprising, in combination:

a base secured within the cab of the truck intermediate the drivers side and the passengers side thereof, the base having a generally planar lower surface;

a drivers side mirror secured to the lower surface of the base, the drivers side mirror being directed out the drivers side of the cab whereby a driver can see over his shoulder;

a first passenger side pair of mirrors secured to the lower surface of the base, the first passenger side pair of mirrors including a downwardly directed mirror aimed towards a right front fender of the truck, the first passenger side pair of mirrors including a reflecting mirror positioned for allowing the driver to see images reflected by the downwardly directed mirror; and a second passenger side pair of mirrors secured to the lower surface of the base, the second passenger side pair of mirrors including a rearwardly directed mirror directed rearwardly of the passenger side of the cab, the second passenger side pair of mirrors including a reflecting mirror positioned for allowing the driver to see images reflected by the rearwardly directed mirror.

* * * * *